United States Patent
Rentzis et al.

(10) Patent No.: US 7,617,535 B2
(45) Date of Patent: Nov. 10, 2009

(54) INFECTED ELECTRONIC SYSTEM TRACKING

(75) Inventors: Alex Rentzis, Mesa, AZ (US); Timothy Verrall, Pleasant Hill, CA (US); Sanjay Rungta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 11/150,503

(22) Filed: Jun. 10, 2005

(65) Prior Publication Data
US 2006/0282895 A1    Dec. 14, 2006

(51) Int. Cl.
*G06F 17/30* (2006.01)
*G06F 17/00* (2006.01)
(52) U.S. Cl. .................. 726/24; 716/11; 716/3
(58) Field of Classification Search .......... 726/24, 726/11, 3
See application file for complete search history.

(56) References Cited

OTHER PUBLICATIONS

Year 2006; Rungta, S.; Rentzis, A.; Sedayao, J.; Adams, R.; Brett, P., "Monitoring Internet Connectivity using PlanetLab," Network Operations and Management Symposium, 2006. NOMS 2006. 10th IEEE/IFIP pp. 1-14.*
New directions in covert malware modeling which exploit whitelisting Wang, J.; Kesidis, G.; Miller, D.J.; Sarnoff Symposium, 2007 IEEE Apr. 30, 2007-May 2, 2007 pp. 1-7.*
Siren: catching evasive malware Borders, K.; Xin Zhao; Prakash, A.; Security and Privacy, 2006 IEEE Symposium on May 21-24, 2006 p. 6 pp.*
A Malware Signature Extraction and Detection Method Applied to Mobile Networks Guoning Hu; Venugopal, D.; Performance, Computing, and Communications Conference, 2007. IPCCC 2007. IEEE Internationa Apr. 11-13, 2007 pp. 19-26.*

\* cited by examiner

*Primary Examiner*—David Y Jung
(74) *Attorney, Agent, or Firm*—Blakely, Sokoloff, Taylor & Zafman LLP

(57) ABSTRACT

Techniques for generating an access control list to block traffic from a network device infected by malware.

12 Claims, 5 Drawing Sheets

US 7,617,535 B2

INFECTED ELECTRONIC SYSTEM TRACKING

TECHNICAL FIELD

Embodiments of the invention relate to malware detection. More particularly, embodiments of the invention relate to dynamically deployed controls to reduce spread of malware and/or to identify and repair electronic systems infected with malware.

BACKGROUND

Identification of malware infection is often accomplished by use of signatures to other identifying characteristics of existing, known malware. Because this identification is reactive there exists the possibility that malware may cause great damage prior to identification and reaction using known methods. Malware may include, for example, a computer virus, a worm or any other type of executable code that causes an electronic system to act in an unauthorized and/or unexpected manner. Electronic systems that may be victim of malware may include, for example, computer systems (both desktop and mobile), cellular telephones, personal digital assistants (PDAs), control systems, automobiles, etc.

As creators of malware become more sophisticated, the damage caused by new malware may increase prior to detection and/or reaction. Thus, current reactive techniques for protecting against malware may be insufficient for the needs of users of electronic devices.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Prevailing network architectures are generally designed for openness, collaboration, and sharing. Many viruses, worms and other malware use these open networks to spread rapidly through the enterprise, which may enable cyber threats to reach their targets quickly. Identification of the infected system and isolation of the infected system from the network is currently reactive and time and/or labor intensive. This adversely affects the containment of the infected systems. Using the techniques described herein to dynamically create and deploy a control system using heuristic analysis may provide an effective early detection and containment strategy.

Figure 1:
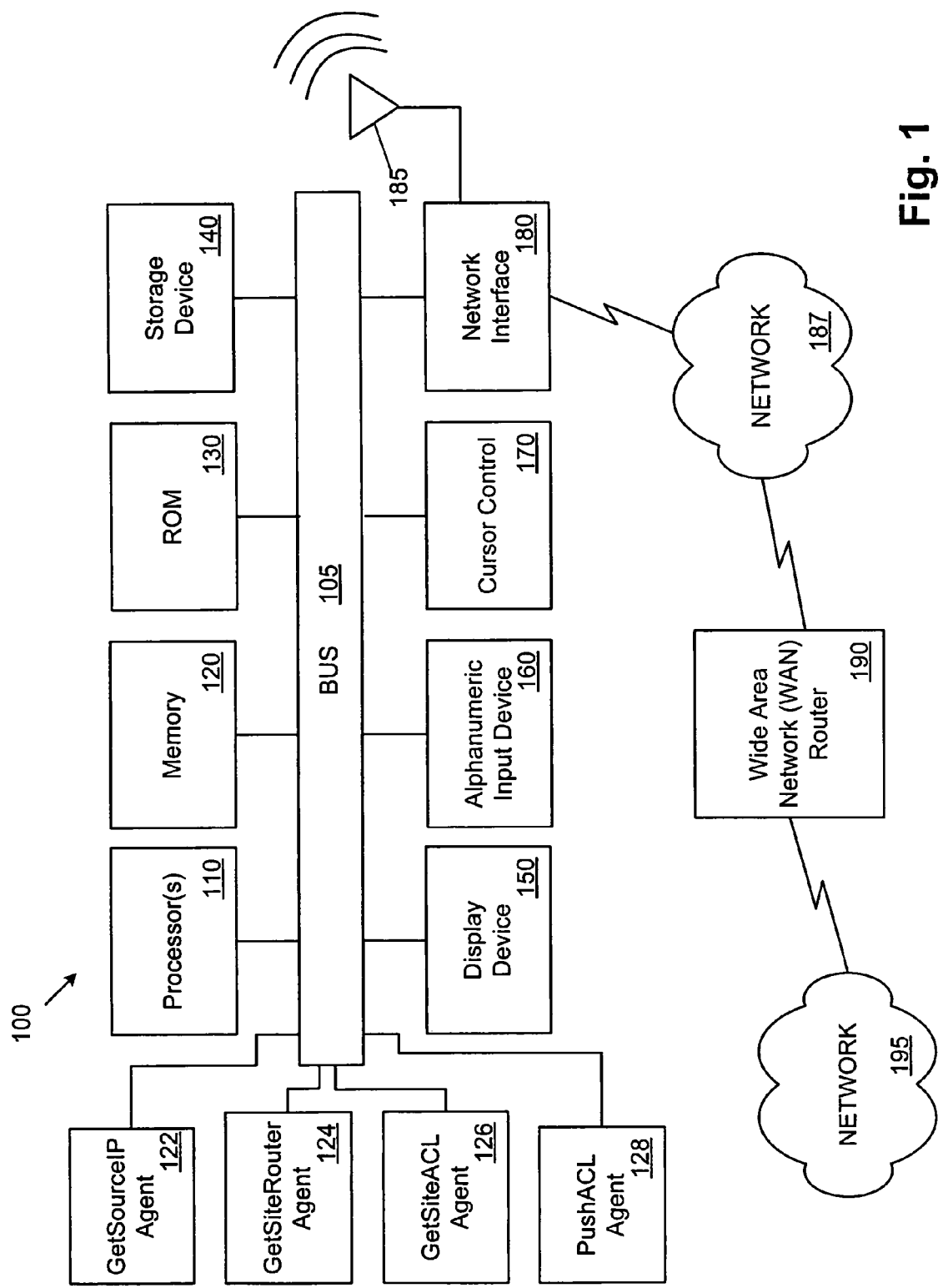
FIG. 1 is a block diagram of one embodiment of an electronic system.

FIG. 1 is a block diagram of one embodiment of an electronic system. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Any number of electronic systems may be coupled to network 195 via one or more network routing devices, for example, wide-area network (WAN) router 190. Electronic system 100 may represent a network node that may become infected with malware. Electronic system 100 may also represent a network management node coupled with the network that may monitor the network checking for other systems infected with malware. In one embodiment, electronic system 100 may be coupled with WAN router 190 via network 187 via wired and/or wireless connections.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e).

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

One of the potential security problems in an enterprise network is the ability that any electronic system has to communicate to other electronic system. Many enterprise networks may be required to support flexible connectivity to portable computers such as laptops for company employees as well as visitors. The added flexibilities in the workplace cause a greater security risk and the exposure of the network is increasing.

WAN router 190 may provide a gateway to network 195. As described in greater detail below, should electronic system 100 become infected by malware, electronic system 100 and/or WAN router 190 may cause electronic system 100 to be logically isolated from network 195. This logical isolation may slow or prevent spread of malware that has infected electronic system 100.

Described herein are techniques the may be referred to as Infected System Tracking that may provide two advantages. The first advantage is to provide an automated mechanism for dynamically creating and deploying controls reducing the spread of malware using, for example, heuristic analysis. The second advantage is to equip network engineers with tools to identify and mitigate the spread of malware infections on the network. In one embodiment, Infected System Tracking may conceptually include four operations: 1) infected system and port identification, 2) infected system site identification, 3) creation of a blocking access control list (ACL) or other blocking mechanism, and 4) propagation of the blocking ACL (or other blocking mechanism).

Heuristic analysis may be based on observed patterns and/or acceptable system operating parameters. For example, under certain conditions a specific level of outbound network traffic may be acceptable while under other conditions the same level of outbound network traffic may be unacceptable. In one embodiment, various operations within components that perform Infected System Tracking may be configurable by a network engineer and/or other appropriate parties.

Identification of an infected system with a new virus is one of the challenges of network system security. Many current anti-malware tools rely upon detecting a signature of a virus. Therefore, these tools cannot detect a new virus or a variation on a known virus that has a new and different signature. In one embodiment, using analysis techniques described herein, a high and low ratio between known and unknown destination traffic to or from an electronic system may be used to detect the presence of malware. With this model, an infected system may be identified without prior knowledge of a virus. Other malware modeling techniques may also be used.

In one embodiment, once an infected system is identified, the closest router or routers may be identified. Using network topology analysis, an electronic system may determine the source location of a closest wide-area network (WAN) router or routers.

To reduce the exposure of a network to the infected electronic system, blocking of the malware may occur at the WAN router. Based upon the infected system and port identification and router information, a blocking ACL may be created to block packets to and/or from the infected electronic system. The blocking ACL may allow other electronic systems to communicate using the same port as the infected system. That is, packets to and/or from the infected system may be blocked rather than all traffic through the port to which the infected electronic system is coupled. The ACL may then be transmitted to the WAN router(s) to reduce the exposure time from malware in the network environment.

In one embodiment, the Infected System Tracking techniques may be implemented as four processes that are referred to herein as: 1) GetSourceIP, 2) GetSiteRouter, 3) GetSiteACL, and 4) PushACL. In one embodiment, the four processes correspond to the four operations described above. The four processes are described in greater detail below; however, in alternate embodiments, the same or similar functionality may be provided using different implementations.

In one embodiment, the processes are implemented as agents (GetSourceIP agent 122, GetSiteRouter agent 124, GetSiteACL agent 126 and PushACL agent 128) that may be implemented as hardware, software, firmware or any combination thereof. For reasons of simplicity of description, GetSourceIP agent 122, GetSiteRouter agent 124, GetSiteACL agent 126 and PushACL agent 128 are illustrated on a single electronic system; however, GetSourceIP agent 122, GetSiteRouter agent 124, GetSiteACL agent 126 and PushACL agent 128 may be distributed across multiple electronic systems.

Figure 2:
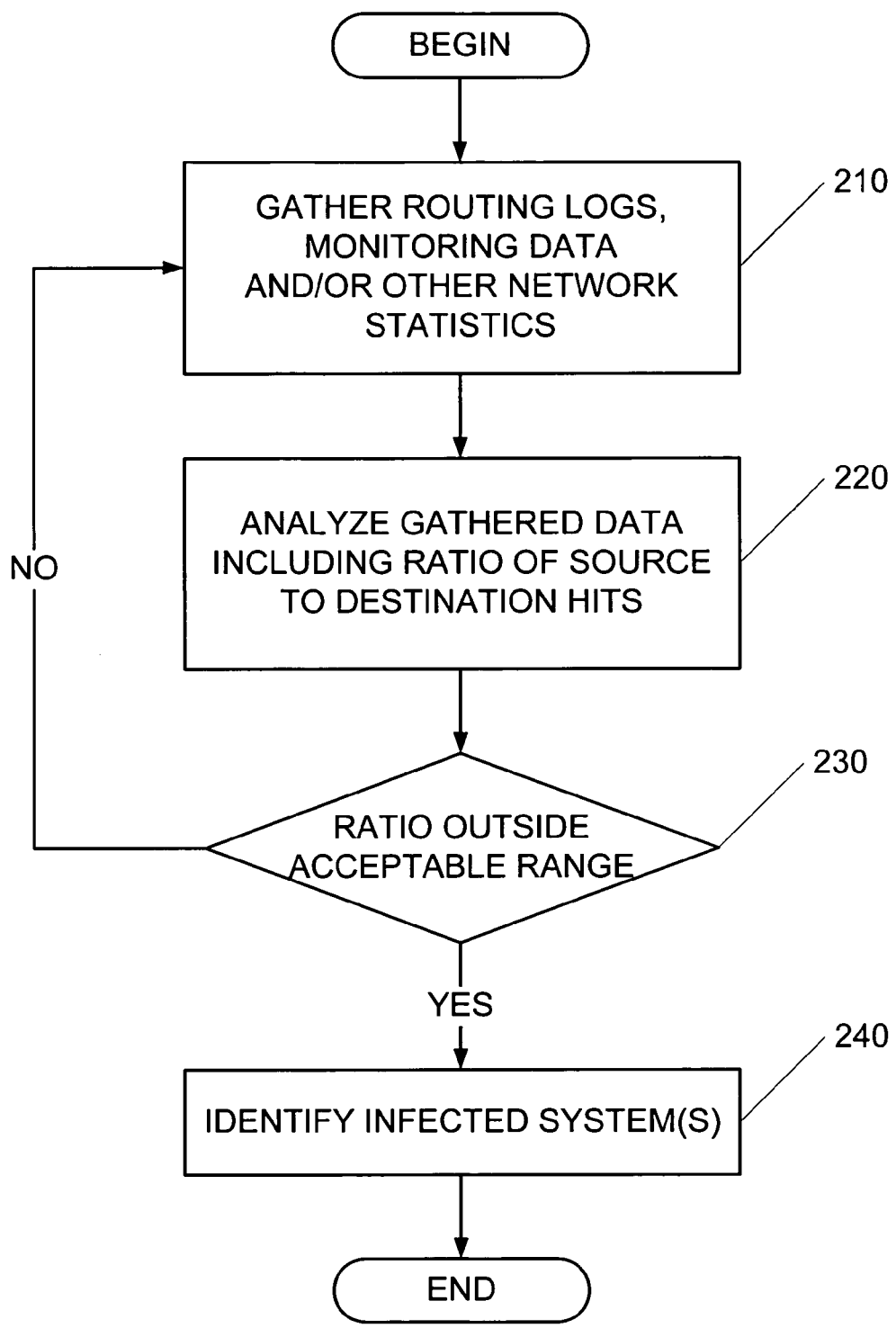
FIG. 2 is a flow diagram of one embodiment of the operation of a GetSourceIP agent.

In one embodiment, GetSourceIP agent 122 may analyze inputs in the form of alerts from other network monitors. In one embodiment, GetSourceIP agent 122 may generate an output that includes, at least in part, a host name and/or an IP address corresponding to an infected electronic system. In one embodiment, the analysis performed by GetSourceIP agent 122 is illustrated in FIG. 2.

GetSourceIP agent 122 may gather routing logs, network monitoring data and/or other statistical measures related to network traffic, 210. The gathered information may be analyzed for various measures including, in one embodiment, determining a ratio of source hits to destination hits, 220. In one embodiment, hits are defined as the number of network packets passing through a router during a selected time period.

In one embodiment, if the ratio of source to destination hits exceeds 1.0:1.1, the corresponding electronic system is considered infected. Other ratios can also be used, for example, 1.0:1.2, 1.0:1.25, 1.0:1.5, etc. In one embodiment, the ratio may be software configurable. If the computed ratio exceeds the selected ratio, 230, the corresponding system is considered infected.

The infected system(s) may be identified, 240. In one embodiment, identification of the infected system(s) includes determining the host name and/or IP address of the infected system(s). The host name and/or IP address of the infected system(s) may be determined in any manner.

Figure 3:
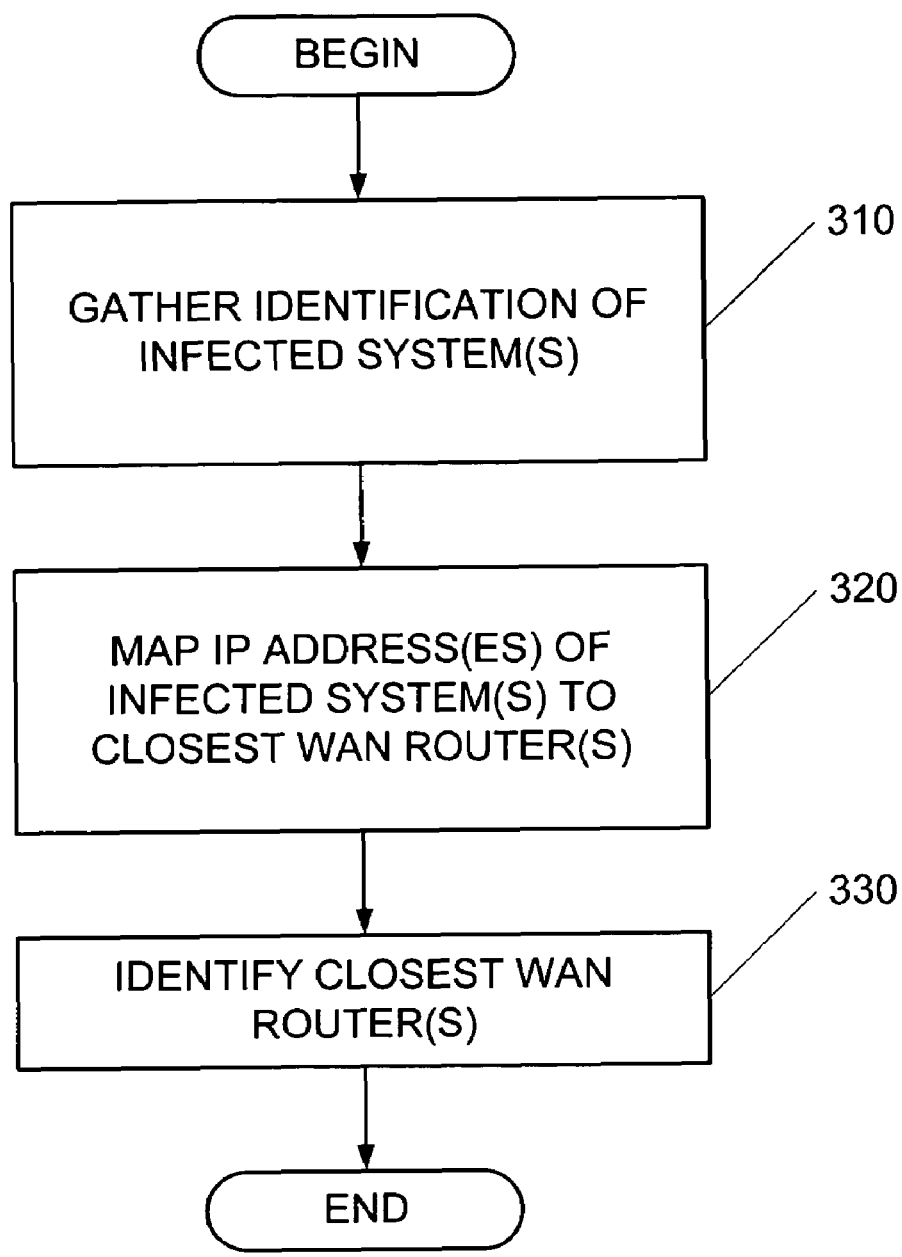
FIG. 3 is a flow diagram of one embodiment of the operation of a GetSiteRouter agent.

FIG. 3 is a flow diagram of one embodiment of the operation of GetSiteRouter agent 124. In one embodiment, GetSiteRouter agent 124 may determine a network routing device logically closest to the infected system. Various techniques may be used to determine the logically closest network routing device using network topology information. The network topology information may be provided, for example, by network management tools.

After gathering identification of the infected system(s), 310, the IP address(es) and/or the host names of the infected system(s) is/are determined, 320. IP addresses and host names may be determined in any manner known in the art. In response to the infected system(s) being identified, one or more closest network routing devices are identified, 330.

In one embodiment, IP tables maintained by network routing devices may be analyzed to determine whether the network routing device is the closest network routing device to the infected system. In addition, static IP tables may also be used in determining the closest network routing device. In one embodiment routing tables may be downloaded from multiple network routing devices and originating networks corresponding to the network routing devices are identified. In one embodiment, a database may be populated with the downloaded routing tables and/or the static IP tables. This database may be analyzed to determine a closest network routing device to an infected electronic system.

Figure 4:
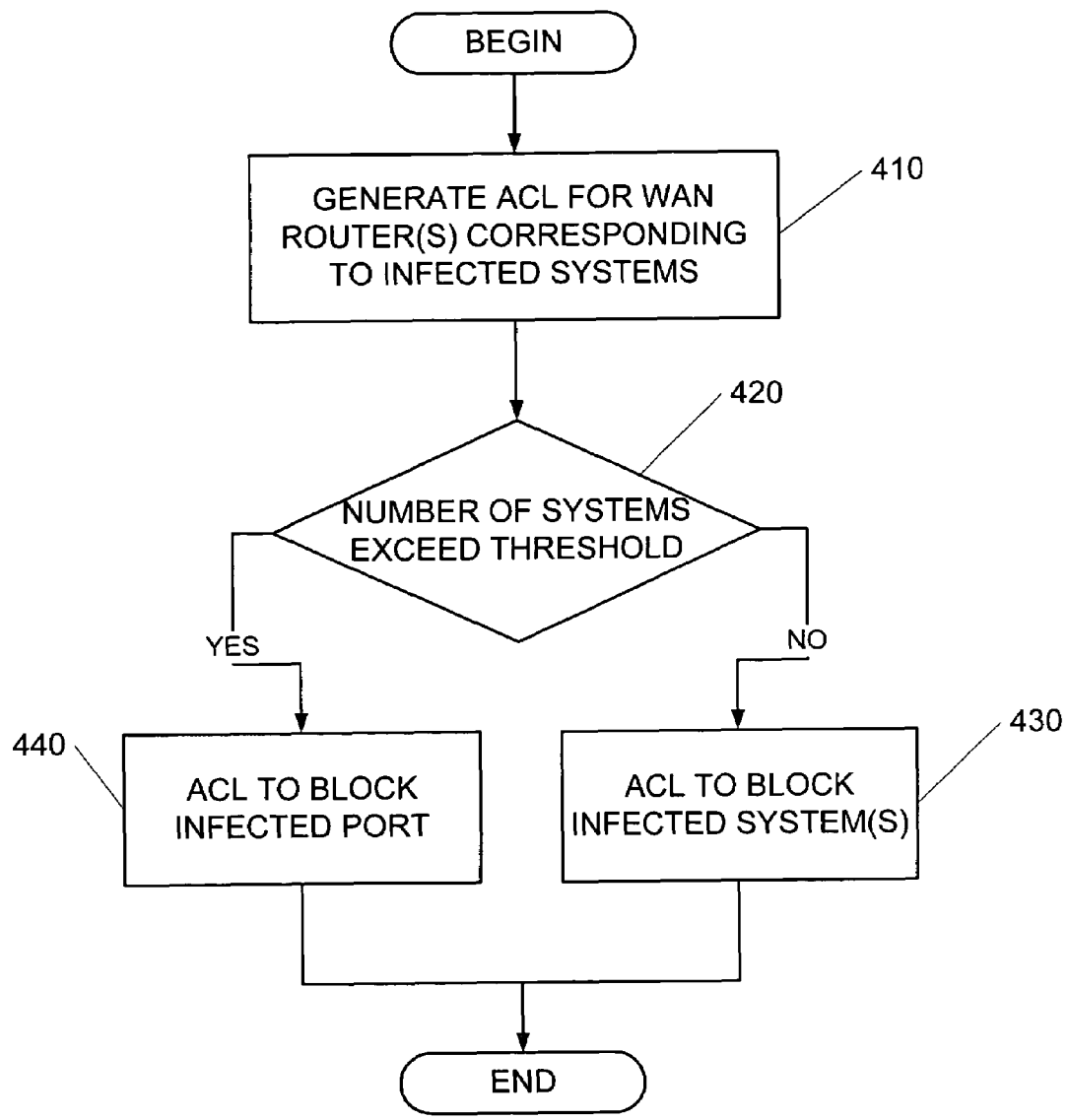
FIG. 4 is a flow diagram of one embodiment of the operation of a GetSiteACL agent.

FIG. 4 is a flow diagram of one embodiment of the operation of GetSiteACL agent 126. In one embodiment, GetSiteACL agent 126 may operate to generate an access control list (ACL) that may be transmitted to one or more network routing devices to cause the network to block transmissions from the infected system(s) identified by the ACL. Other blocking mechanisms may also be used.

In one embodiment, the ACL identifying the infected system(s) may be generated, 410. The ACL may identify the infected system(s) in any manner known in the art, for example, by IP address and/or host name as described above, or by another identification parameter.

In one embodiment, if the number of infected systems identified by an ACL exceed a pre-selected threshold, 420, the ACL is configured to block a port of the network routing device, 440. In one embodiment, if the number of infected systems identified by an ACL does not exceed the pre-selected threshold, 420, the ACL is configured to block individual infected systems at network routing device level, 430.

Figure 5:
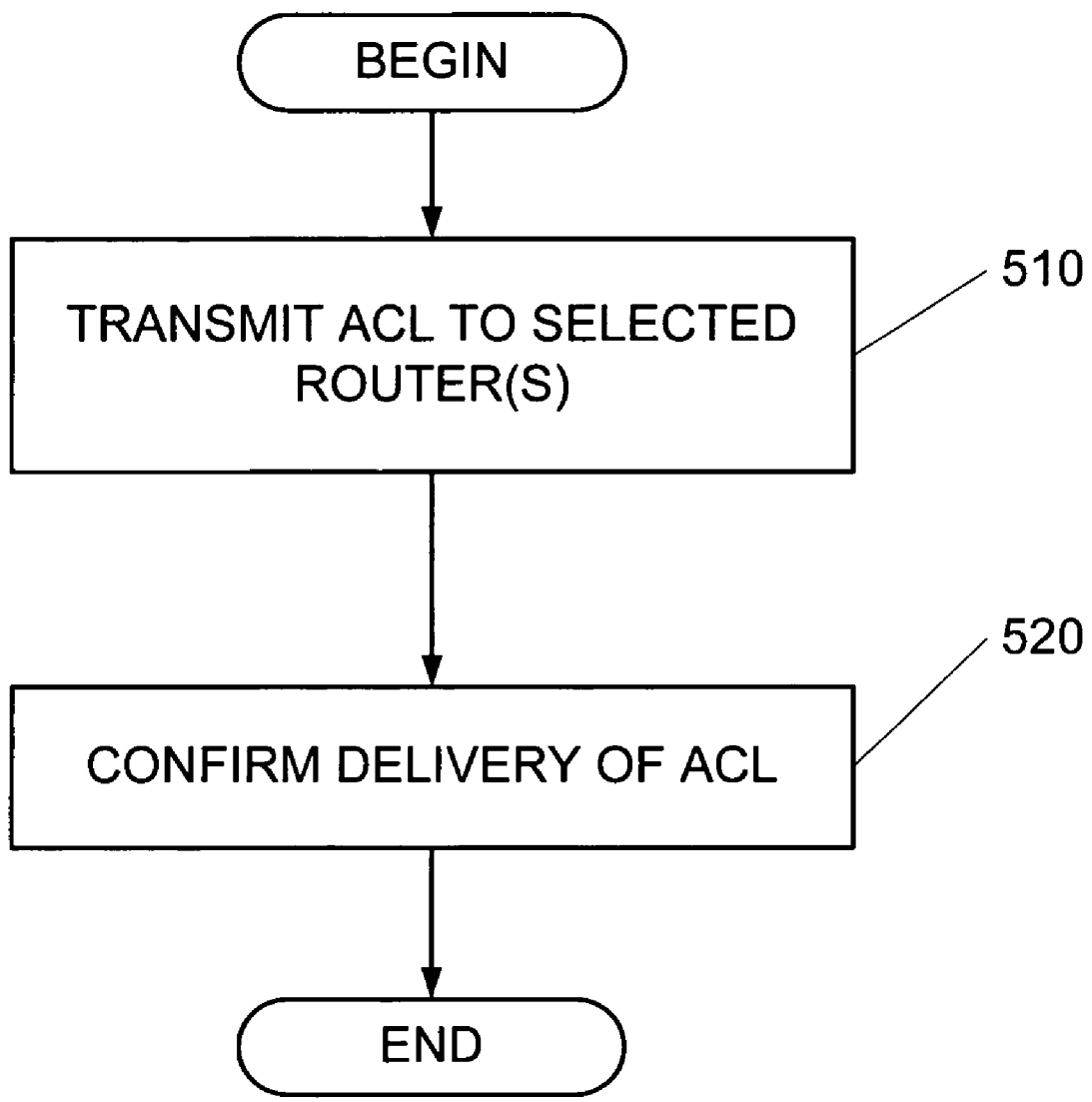
FIG. 5 is a flow diagram of one embodiment of the operation of a PushACL agent.

FIG. 5 is a flow diagram of one embodiment of the operation of PushACL agent 128. In one embodiment, PushACL agent 128 may cause the ACL to be transmitted to one or more network routing devices, 510. Delivery may be confirmed, 520, in any manner known in the art.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   determining whether a networked electronic device meets a profile corresponding to presence of malware by analyzing network traffic with a first agent implemented on the networked electronic device that analyzes alerts from other network monitors;
   determining one or more network routing devices logically closest to the networked electronic device meeting the profile with a second agent implemented on the networked electronic device, if the networked device meets the profile;
   generating an access control list with a third agent implemented on the networked electronic device for the one or more network routing devices logically closest to the networked electronic device to cause the one or more network routing devices to block selected traffic to and from the electronic device meeting the profile; and
   transmitting the access control list to the one or more network routing devices.

2. The method of claim 1 wherein determining whether the networked electronic device meets the profile corresponding to presence of malware by analyzing network traffic comprises:
   determining a number of source hits corresponding to the electronic device;
   determining a number of destination hits corresponding to the electronic device;
   determining a ratio of source hits to destination hits; and
   generating an indication of the electronic device meeting the profile if the ratio exceeds a pre-selected threshold value.

3. The method of claim 1 wherein determining the one or more network routing devices logically closest to the electronic device meeting the profile comprises:
   parsing an address table maintained by at least one of the network routing devices; and
   identifying from entries in the routing table the one or more network routing devices logically closest to the electronic device meeting the profile.

4. The method of claim 1 wherein generating an access control list for the one or more network routing devices to block selected traffic to and from the electronic device meeting the profile comprises:
   generating a list of electronic devices for which selected traffic is to be blocked for each of the one or more network routing devices;
   causing the network routing device to block selected traffic for a port corresponding to electronic devices meeting the profile if a number of electronic devices for which selected traffic is to be blocked exceeds a predetermined number.

5. An article of manufacture comprising a computer-readable medium having stored thereon instructions that, when executed, cause one or more processors to:
   determine whether a networked electronic device meets a profile corresponding to presence of malware by analyzing network traffic with a first agent implemented on the networked electronic device that analyzes alerts from other network monitors;
   determine one or more network routing devices logically closest to the networked electronic device meeting the profile with a second agent implemented on the networked electronic device, if the networked device meets the profile;
   generate an access control list with a third agent implemented on the networked electronic device for the one or more network routing devices logically closest to the networked electronic device to cause the one or more network routing devices to block selected traffic to and from the electronic device meeting the profile; and
   transmit the access control list to the one or more network routing devices.

6. The article of claim 5 wherein the instructions that cause the one or more processors to determine whether the networked electronic device meets the profile corresponding to presence of malware by analyzing network traffic comprise instructions that, when executed, cause the one or more processors to:

determine a number of source hits corresponding to the electronic device;

determine a number of destination hits corresponding to the electronic device;

determine a ratio of source hits to destination hits; and generate an indication of the electronic device meeting the profile if the ratio exceeds a pre-selected threshold value.

7. The article of claim 5 wherein the instructions that cause the one or more processors to determine the one or more network routing devices logically closest to the electronic device meeting the profile comprise instructions that, when executed, cause the one or more processors to:

parse an address table maintained by at least one of the network routing devices; and identify from entries in the routing table the one or more network routing devices logically closest to the electronic device meeting the profile.

8. The article of claim 5 wherein the instructions that cause the one or more processors to generate the access control list for the one or more network routing devices to block selected traffic to and from the electronic device meeting the profile comprise instructions that, when executed, cause the one or more processors to:

generate a list of electronic devices for which selected traffic is to be blocked for each of the one or more network routing devices;

cause the network routing device to block selected traffic for a port corresponding to electronic devices meeting the profile if a number of electronic devices for which selected traffic is to be blocked exceeds a predetermined number.

9. A network architecture comprising:

an analysis agent to determine whether an electronic system exhibits characteristics corresponding to a malware infection;

an identification agent communicatively coupled with the analysis agent to determine identification information corresponding to the electronic system when the electronic system exhibits the characteristics corresponding to the malware infection;

an access control agent communicatively coupled with the identification agent to generate an access control list including the identification information corresponding to the electronic system; and a communication agent communicatively coupled with the access control agent to cause the access control list to be transmitted to a network routing device logically closest to the electronic system.

10. The network architecture of claim 9 wherein the analysis agent determines a number of source hits corresponding to the electronic device, determines a number of destination hits corresponding to the electronic device, determines a ratio of source hits to destination hits, and generates an indication of the electronic device meeting the profile if the ratio exceeds a pre-selected threshold value.

11. The network architecture of claim 9 wherein the access control agent determines one or more network routing devices logically closest to the electronic device by parsing an address table maintained by at least one of the network routing devices, and identifying from entries in the routing table the one or more network routing devices logically closest to the electronic device meeting the profile.

12. The network architecture of claim 9 wherein generating the access control list including the identification information corresponding to the electronic system comprises:

generating a list of electronic devices for which selected traffic is to be blocked for each of the one or more network routing devices;

causing the network routing device to block selected traffic for a port corresponding to electronic devices meeting the profile if a number of electronic devices for which selected traffic is to be blocked exceeds a predetermined number.

* * * * *